United States Patent Office 3,567,730
Patented Mar. 2, 1971

3,567,730
DIBENZOCYCLOHEPTATRIENE DERIVATIVES
AND THEIR PREPARATION
Jean Clement Louis Fouche, Hauts-de-Seine, France,
assignor to Rhone-Poulenc S.A., Paris, France
No Drawing. Filed June 15, 1966, Ser. No. 557,604
Claims priority, application France, June 18, 1965,
21,444; May 4, 1966, 60,266
The portion of the term of the patent subsequent to
Nov. 25, 1986, has been disclaimed
Int. Cl. C07d 29/10, 27/02, 87/28, 51/70, 87/38
U.S. Cl. 260—268                                    8 Claims

ABSTRACT OF THE DISCLOSURE

New 2 - substituted - 11 - aminoalkyldibenzo[a,d]cycloheptatrienes have useful pharmacodynamic properties as, inter alia, neuroleptics, sedatives, tranquilizers, antihistaminics, anti-emetics, and analgesics.

---

This invention relates to therapeutically useful dibenzo[a,d]-cycloheptatriene derivatives, to processes for their preparation, and to pharmaceutical compositions containing them.

According to the present invention, there are provided new dibenzo[a,d]cycloheptatriene derivatives of the general formula:

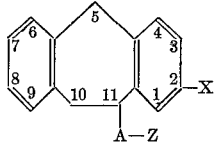

wherein:

X represents a halogen atom or an alkyl, alkoxy, alkylthio, alkanesulphinyl or alkanesulphonyl group;
A represents a straight or branched saturated, divalent aliphatic hydrocarbon chain in which at least 2 carbon atoms separate Z from the dibenzocycloheptatriene nucleus; and
Z represents an amino, monoalkylamino or dialkylamino group, or a heterocyclic group of the formula:

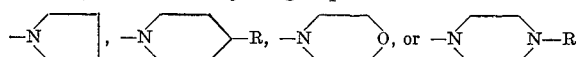

in which R represents a hydrogen atom or a hydroxyl or hydroxyalkyl group, and R' represents a hydrogen atom or an alkyl, hydroxyalkyl, hydroxyalkoxyalkyl, alkenyl, or alkynyl group, or a phenyl, phenylalkyl or phenylalkenyl group in which the phenyl nucleus may be substituted by one or more halogen, alkyl, alkoxy, nitro, amino or trifluoromethyl radicals, all the aliphatic hydrocarbon chains in the X, A, Z, R and R' substituents having at most 5 carbon atoms; together with the acid addition salts and the quaternary ammonium salts of these compounds.

The new products of the general Formula I may, if desired, be purified by physical methods (such as distillation, crystallisation or chromatography) or by chemical methods (such as formation of salts, crystallisation of these and decomposition in alkaline medium). In these operations, the nature of the anion of the salt is immaterial, the only condition being that the salt should be well-defined and readily crystallisable.

The compounds of this invention may be converted into addition salts with acids and into quaternary ammonium salts. The acid addition salts may be obtained by reacting the compounds with acids in appropriate solvents. Suitable organic solvents include alcohols, ethers, ketones and chlorinated solvents. The salt formed precipitates, after concentration of its solution when appropriate, and is separated by filtration or decantation. The quaternary ammonium salts may be obtained by the action of the compounds with esters, optionally in an organic solvent, at normal temperature or, more rapidly, with moderate heating.

The compounds of the invention, together with their acid addition salts and their quaternary ammonium salts, have interesting pharmacodynamic properties. They are especially effective on the central nervous system, acting as neuroleptics, sedatives and tranquilizers. They also have good antihistaminic, antiemetic and analgesic activity.

For medicinal use the new compounds may be employed either in the form of the bases or in the form of pharmaceutically acceptable acid addition salts or quaternary ammonium salts, i.e. those salts which are not toxic in the doses in which they are employed. Examples of pharmaceutically acceptable addition salts include salts of certain mineral acids such as the hydrochlorides, sulphates, nitrates and phosphates, and of certain organic acids, such as the acetates, propionates, succinates, benzoates, fumarates, maleates, theophyllineacetates, salicylates, phenolphthalinates, and methylene-bis-β-hydroxynaphthoates, and substitution derivatives of these acids. Examples of pharmaceutically acceptable quaternary ammonium salts include derivatives of organic esters, such as methyl, ethyl, allyl or benzyl chlorides, bromides and iodides, the methyl and ethyl sulphates, the benzene sulphonates and substituted derivatives of these compounds.

Amongst the compounds of Formula I those of particular importance are those of the general formula:

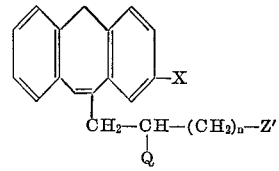

in which Q represents a hydrogen atom and $n$ is equal to 1, or Q represents a methyl radical and $n$ is zero, Z' represents a dimethylamino, 4-methyl-1-piperazinyl, 4-hydroxyethyl-1-piperazinyl, 4-hydroxyethoxyethyl-1-piperazinyl or 4-hydroxypiperidino group, and X is as defined above.

Especially important are the following compounds:

2-methoxy-11-(3-dimethylaminopropyl)dibenzo[a,d]
   cycloheptatriene,
2-methoxy-11-(2-dimethylaminopropyl)dibenzo[a,d]
   cycloheptatriene,
2-chloro-11-[3-(4-hydroxyethoxyethyl-1-piperazinyl)
   propyl]dibenzo[a,d]cycloheptatriene, and
2-bromo-11-(3-dimethylaminopropyl)dibenzo[a,d]
   cycloheptatriene.

According to a feature of the invention, the new compounds of the Formula I may be prepared by reacting an amine of the general formula:

in which Z is as defined above, with a dibenzo[a,d]cycloheptatriene derivative of the general formula:

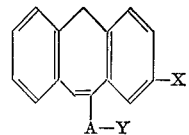

in which A and X are as defined above, and Y represents a reactive ester residue, such as a halogen atom, or a sulphuric or sulphonic ester residue, for example a methanesulphonyloxy or toluene-p-sulphonyloxy radical. This reaction is preferably carried out in an inert organic solvent, such as an aromatic hydrocarbon (e.g. benzene or xylene) or an alcohol (e.g. ethanol). It is particularly advantageous to operate at the boiling temperature of the solvent in the presence of an excess of amine of the general Formula II which serves as the condensing agent.

The starting dibenzo[a,d]cycloheptatriene derivatives of the general Formula III may be obtained from the corresponding alcohols of the general formula:

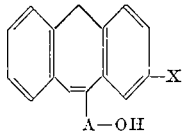

IV in which A and X are as defined above, by conventional methods for the preparation of reactive esters from the corresponding alcohols.

The dibenzo[a,d]cycloheptatriene alcohols of the general Formula IV may be prepared in various ways, depending upon the structure of the chain A.

(A) Those alcohols of Formula IV in which at least 3 carbon atoms of chain A are present between the dibenzocycloheptatriene nucleus and the hydroxy group may be prepared by the reaction between a dibenzo[a,d]cycloheptadiene derivative of the general formula:

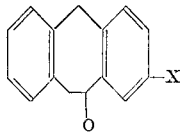

V in which X is as defined above, and an organomagnesium compound of the general formula:

Hal—Mg—A′—O—B            VI in which Hal represents a halogen atom, A′ represents a divalent hydrocarbon radical having a straight or branched chain of at most 5 carbon atoms, at least 3 of which are between the Mg atom and the —OB residue, and B represents a protective group which can be readily eliminated by subsequent treatment, which yields a product of the general formula:

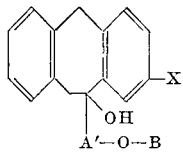

VII

The hydrolysis of the group OB and the dehydration of compound VII may be effected simultaneously, or the compound may first be converted into a product of the formula:

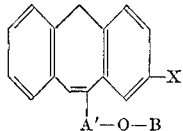

VIII in which the group OB is thereafter converted into the group OH by application of known methods.

The reaction of the compound V with the organomagnesium compound VI preferably takes place in an aromatic hydrocarbon, e.g. benzene, or an ether, e.g. diethylether or tetrahydrofuran, solvent at normal temperature or with moderate heating. The dehydration is carried out using known dehydration agents, for example by means of hydrochloric acid in alcohol or by means or sulphuric acid. B preferably represents a benzyl radical.

The ketones of general Formula V may be prepared as follows:

(a) Those in which X represents a halogen atom or an alkyl, alkoxy or alkylthio radical may be prepared by cyclisation of substituted phenylacetic acid of the formula:

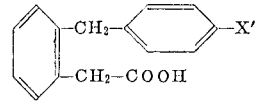

IX in which X′ represents a halogen atom or an alkyl, alkoxy or alkylthio group. This cyclisation is advantageously carried out by heating the compounds of Formula IX in the presence of polyphosphoric acid or its esters, preferably at a temperature between 60° and 180° C. However, the compounds of Formula IX may also be converted into the corresponding acid chlorides by known methods, and the cyclisation of the latter may be effected by a Friedel-Crafts reaction, for example by means of aluminium chloride in a solvent such as carbon disulphide.

The substituted phenylacetic acids of Formula IX may be prepared from orthobenzylbenzoic acids of formula:

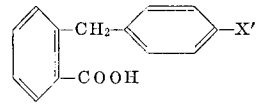

X by known methods of converting an acid into its next higher homologue. Thus, the acids of Formula X may first be esterified by reaction with methyl alcohol, and the esters obtained reduced to give alcohols of the formula:

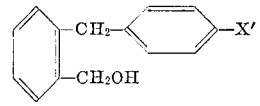

XI

When treated with an appropriate halogenation agent, preferably a chlorinating agent such as thionyl chloride, these alcohols give halogenated derivatives of the formula:

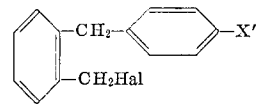

XII in which Hal represents a halogen atom, preferably chlorine or bromine. On treatment with an alkali cyanide, these halogenated derivatives of Formula XII yield nitriles of formula:

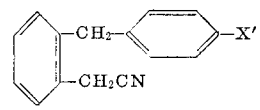

XIII whose hydrolysis yields acids of the Formula IX.

The starting orthobenzylbenzoic acids of general formula X may be prepared by known methods. A preferred method consists of reacting phthalic anhydride, under Friedel-Crafts reaction conditions, with a compound of the formula:

XIV in which X′ is as defined above, to form an orthoaroylbenzoic acid of the formula:

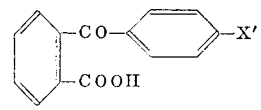

XV which is then reduced to obtain the desired orthobenzylbenzoic acid of the Formula X. This last stage may be carried out by known methods, for example by hydrogenation in the presence of a hydrogenation catalyst such as palladium, or by the action of a reducing agent such as zinc in an ammoniacal medium.

(b) Those ketones of Formula V in which X represents an alkanesulphinyl or alkanesulphonyl radical may be prepared by oxidising the corresponding ketone of Formula V in which X represents an alkylthio radical. This oxidation may be carried out, for example, by the action of hydrogen peroxide in an acetic acid medium.

(B) Those alcohols of Formula IV in which at least 3 carbon atoms of chain A are present between the dibenzocycloheptatriene nucleus and the hydroxy group and in which X represents an alkanesulphinyl or alkanesulphonyl radical, may also be prepared from compounds of the Formula VIII in which X represents an alkylthio radical, by oxidising the alkylthio group of this compound in order to convert it into an alkanesulphinyl or alkanesulphonyl group, and then converting the group OB into an hydroxyl group by known methods.

(C) Those alcohols of Formula IV whose chain A is of the type:

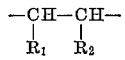

in which $R_1$ represents a hydrogen atom or an alkyl radical having from 1 to 3 carbon atoms and $R_2$ represents an alkyl radical having from 1 to 3 carbon atoms, may be prepared by the following procedure:

The dibenzo[a,d]cycloheptadiene derivatives of the Formula V are first reacted in accordance with the Reformatsky reaction with halogenated derivatives of the formula:

$$\text{Hal}-\underset{R_1}{\text{CH}}-\text{COOR}_3 \qquad \text{XVI}$$

in which Hal represents a halogen atom, $R_1$ is as previously defined and $R_3$ represents an alkyl radical containing from 1 to 4 carbon atoms, to yield dibenzo[a,d]cycloheptatriene ester derivatives of the formula:

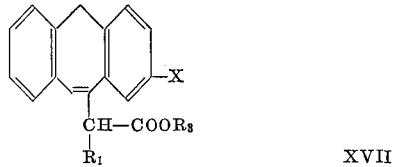
XVII in which X, $R_1$ and $R_3$ are as previously defined. These esters are then converted into the corresponding acid chlorides of the formula:

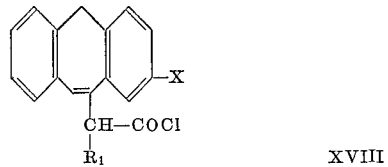
XVIII in which X and $R_1$ are as previously defined, by known methods, e.g. hydrolysis of the esters into acids, followed by reaction, for example, with thionyl chloride.

The acid chlorides of the Formula XVIII are then reacted with an organocadmium derivative of the formula:

$$R_2-Cd-R_2 \qquad \text{XIX}$$

in which $R_2$ is as previously defined, preferably prepared in situ by the action of cadmium chloride on the corresponding organomagnesium derivative of the general formula $R_2$—MgHal, to give ketones of the formula:

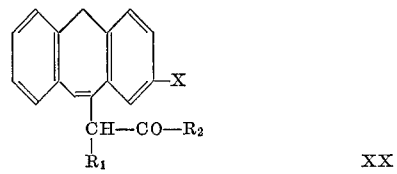
XX in which X, $R_1$ and $R_2$ are as previously defined. These ketones are finally converted into alcohols of the Formula IV by known methods of reducing ketones to alcohols which do not reduce the ethylenic bonds, preferably by the action of a metallic hydride such as potassium borohydride.

The reaction with the organocadmium compound preferably takes place in an aromatic hydrocarbon, e.g. benzene, or an ether, e.g. diethylether or tetrahydrofuran, solvent, the reaction mixture being heated under reflux of the solvent.

In a further embodiment of the invention, those compounds of Formula I in which X represents an alkanesulphinyl or alkanesulphonyl radical may also be prepared by oxidation of the corresponding compounds of the Formula I in which A represents an alkylthio radical. This oxidation may be conveniently carried out by means of hydrogen peroxide in an acetic acid medium.

In yet a further embodiment of the invention, those compounds of the general Formula I wherein Z represents a group of the formula:

may be prepared by reacting a reactive ester of the formula R''—Y with a dibenzo[a,d]cycloheptatriene derivative of the formula:

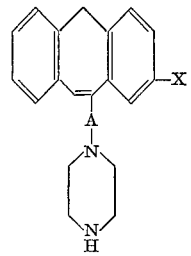

wherein A and X are as defined above, Y represents a reactive ester residue, and R'' may have any of the meanings of R' defined above other than a hydrogen atom or a phenyl group.

The condensation is preferably carried out in an inert organic solvent such as an aromatic hydrocarbon, e.g. benzene or xylene, or an amide, e.g. dimethylformamide. It is particularly advantageous to carry out the reaction at the boiling temperature of the solvent, in the presence of an alkaline condensing agent.

The following examples illustrate the invention.

EXAMPLE 1

To a benzene solution of 2-methoxy-11-(3-methanesulphonyloxypropyl)dibenzo[a,d]cycloheptatriene (100 cc.) obtained as described below, there is added a benzene solution of dimethylamine (430 cc. containing 5 mol. of dimethylamine per litre of solution). The whole is heated in an autoclave at 100° C. for 17 hours. After cooling, the reaction mixture is treated with distilled water (500 cc.) and 10 N sodium hydroxide solution (50 cc.). The decanted aqueous solution is washed with ether (300 cc.). The combined organic solutions are washed to neutrality ten times with distilled water (total 3000 cc.) and then twice extracted with 2 N methanesulphonic acid (total 600 cc.). The combined acid solutions are made alkaline with 10 N sodium hydroxide (150 cc.). The oil which salts out is twice extracted with ether (total 66 cc.). The combined ethereal solutions are twice washed with distilled water (total 600 cc.), dried over anhydrous potassium carbonate and evaporated.

The oily residue (11.5 g.) is distilled under reduced pressure (0.03 mm. Hg). There is obtained a middle fraction (8.9 g.) having a boiling point of 170–190° C. under 0.03 mm. Hg. This oily fraction is dissolved in ethyl acetate (35 cc.). The solution obtained is poured into a boiling solution of maleic acid (3.35 g.) in ethyl acetate (270 cc.). After cooling for 4 hours at 3° C., the crystals which have appeared are separated, twice washed with iced ethyl acetate (total 36 cc.) and dried under reduced pressure (20 mm. Hg). There is obtained 2-methoxy-11-(3 - dimethylaminopropyl)dibenzo[a,d]cycloheptatriene maleate (10 g.), M.P. 132° C.

The crude starting 2-methoxy-11-(3-methanesulphonyloxypropyl)dibenzo[a,d]cycloheptatriene is prepared as follows:

(a) Preparation of 2-(4-methoxybenzyl)benzoic acid 2-(4-methoxybenzoyl)benzoic acid (350 g.) is hydrogenated under 40 kg./cm.² of hydrogen and at a temperature of 70° C. in methanol (2300 cc.) in the presence of palladium on charcoal catalyst (66 g.) (2.8% of palladium).

After cooling, the catalyst is separated by filtration and washed with methanol (800 cc.). On evaporation of the methanolic solution under reduced pressure, there is obtained 2-(4-methoxybenzyl)benzoic acid (324 g.) M.P. 111–112° C.

The 2-(4-methoxybenzoyl)benzoic acid (M.P.=144–145° C.) employed as starting material is prepared in accordance with Lin-Che-Kin, Ann. Ch. 13, 317 (1940), by condensation of phthalic anhydride with anisole in nitrobenzene in the presence of aluminium chloride.

(b) Preparation of methyl 2-(4-methoxybenzyl)benzoate

Sulphuric acid (135 cc., $d=1.83$) is added over 45 minutes to a stirred mixture cooled at 8° C., which is composed of 2-(4-methoxybenzyl)benzoic acid (324 g.) and methanol (2900 cc.).

The mixture is thereafter heated under reflux for 4 hours. Methanol (1700 cc.) is distilled off under normal pressure and then, after cooling, the residue is poured on to a stirred mixture of ice (3 kg.), water (900 cc.) and methylene chloride (1800 cc.). The organic solution is decanted and the aqueous layer is washed twice with methylene chloride (total 1 litre). The chloromethylenic extracts are combined and successively washed with water (1000 cc.), aqueous 5% sodium bicarbonate solution (300 cc.) and water (500 cc.). After drying over sodium sulphate, the solvent is evaporated and the residue is then distilled under reduced pressure. There is obtained methyl 2-(4-methoxybenzyl)benzoate (324 g.) B.P./0.3 mm. Hg=150–160° C.

(c) Preparation of 2-(4-methoxybenzyl)benzyl alcohol

To a solution of lithium aluminium hydride (48.1 g.) in anhydrous tetrahydrofuran (750 cc.) the preceding ester (324 g.) is added with stirring over 1 hour, and the mixture is then heated for 1 hour on the oil bath at 80° C. The reaction mixture, cooled by an ice bath, is treated successively with water (58 cc.), aqueous 20% sodium hydroxide solution (48 cc.) and water (20 cc.). The product is stirred for 1 hour and filtered and the insoluble matter is washed with tetrahydrofuran (150 cc.) and then thrice with diethyl ether (total 600 cc.). The filtrate is concentrated under 20 mm. Hg and the residual oil is distilled under 0.2 mm. Hg. There is obtained 2-(4-methoxybenzyl)benzyl alcohol (278.7 g.) B.P./0.2 mm. Hg=170–180° C.; solidification point about 30° C.

(d) Preparation of 2-(4-methoxybenzyl)benzyl chloride

Thionyl chloride (165.5 g.) is added over 90 minutes to a stirred solution, cooled at about 20° C., of 2-(4-methoxybenzyl)benzyl alcohol (278.7 g.) in chloroform (700 cc.). The mixture is thereafter heated under reflux until the evolution of gas ceases (total 4 hours). After cooling, water (600 cc.) is added and the organic layer is decanted and washed with an aqueous 5% sodium bicarbonate solution (200 cc.) and then with water (200 cc.). After drying over sodium sulphate and concentration under reduced pressure, there is obtained 2-(4-methoxybenzyl)benzyl chloride (298 g.) B.P./0.7 mm. Hg=150–158° C.; solidification point about 36° C.

(e) Preparation of 2-(4-methoxybenzyl)phenylacetonitrile

A mixture of potassium cyanide (4 g.), water (400 cc.), ethanol (1500 cc.) and 2-(4-methoxybenzyl)benzyl chloride (298 g.) is heated under reflux for 7 hours. Aqueous ethanol (1300 cc.) is then distilled off under 30 mm. Hg and, after cooling, there is added to the residue distilled water (1850 cc.) and methylene chloride (850 cc.). The organic layer is decanted and the aqueous layer is extracted with methylene chloride (500 cc.). The chloromethylenic extracts are combined and washed with water (1000 cc.). After drying over sodium sulphate, the organic solution is evaporated under reduced pressure. There is obtained 2-(4-methoxybenzyl)phenylacetonitrile (266.7 g.), M.P. about 65° C.

(f) Preparation of a 2-(4-methoxybenzyl)phenylacetic acid

A solution of the nitrile prepared in (e) (266.7 g.) in ethanol (760 cc.) is heated under reflux for 24 hours with potassium hydroxide pellets (190 g.) in water (190 cc.). After evaporation of the ethanol under normal pressure, there is added to the residue water (380 cc.) and methylene chloride (500 cc.). The mixture is cooled on the ice bath and hydrochloric acid (310 cc., $d=1.19$) is run in with stirring over 1 hour. Water (150 cc.) is added to dissolve the mineral salts, and also methylene chloride (300 cc.) is added. The organic layer is decanted and the aqueous layer is washed with methylene chloride (400 cc.). The whole of the chloromethylenic solution is washed with water (400 cc.), dried over sodium sulphate and then concentrated under reduced pressure. After crystallisation of the oily residue from cyclohexane, there is obtained 2-(4-methoxybenzyl)phenylacetic acid (196 g.), M.P. 70° C.

(g) Preparation of 2-methoxy-11-oxodibenzo-[a,d]cycloheptadiene

To a stirred mixture, heated at 80° C., of orthophosphoric acid (900 cc., $d=1.71$) and phosphorus pentoxide (1500 g.) is added over 30 minutes 2-(4-methoxybenzyl)phenylacetic acid (154 g.) (M.P.=70° C.). The reaction mixture is maintained at 80° C. for another 90 minutes and then allowed to cool, and is then poured with stirring onto a mixture of ice (3 kg.) and ether (3 litres). After decantation, the aqueous layer is washed with ether (2 litres). The ethereal solutions are combined and washed with distilled water (1 litre) and then with 0.5 N sodium hydroxide (600 cc.), and finally with distilled water (1 litre). The solution obtained is dried over anhydrous sodium sulphate in the presence of decolorising charcoal and then filtered and concentrated. There is obtained a red oil (119.3 g.) which is distilled to give a product (87 g.) boiling at about 200° C. under 0.7 mm. Hg, which, after recrystallisation from ethanol (170 cc.), gives 2 - methoxy-11-oxodibenzo[a,d]cycloheptadiene (80 g.), M.P. 82–84° C.

(h) Preparation of 2-methoxy-11-hydroxy-11-(3-benzyloxypropyl)dibenzo[a,d]cycloheptadiene To a suspension of magnesium turnings (6.75 g.) in anhydrous ether (150 cc.), in the presence of a trace of iodine, is added over 45 minutes a solution of 1-bromo-3-benzyloxypropane (63.5 g.) in anhydrous ether (150 cc.). The mixture decolorises, and the heat of reaction maintains the reflux of the ether. When the addition is complete, the reaction mixture is heated under reflux for 1 hour. After cooling, a solution of 2-methoxy-11-oxodibenzo[a,d]cycloheptadiene (22 g.) in ether (350 cc.) was added over 5 minutes to the magnesium solution thus prepared. The solution obtained is thereafter heated under reflux for 6 hours. After cooling to 25° C. there is carefully added, distilled water (100 cc.), a solution of ammonium chloride (230 g.) in distilled water (800 cc.), and finally ether (500 cc.). The aqueous solution is decanted and then washed with ether (500 cc.). The combined etheral solutions are washed to neutrality three times with distilled water (total 1500 cc.) and then dried over anhydrous potassium carbonate and evaporated. The sparingly volatile products are eliminated by heating at 150° C. under reduced pressure (0.1 mm. Hg) for 1 hour. The oily residue obtained (46.4 g.) is dissolved in boiling diisopropyl ether (350 cc.). After cooling at 3° C. for 4 hours, the crystals which have appeared are separated, washed with iced diisopropyl ether (50 cc.) and dried under reduced pressure (20 mm. Hg). There is obtained 2-methoxy-11-hydroxy-11 - (3-benzyloxypropyl)dibenzo-[a,d]cycloheptadiene (26.9 g.), M.P. 100–101° C.

(i) Preparation of 2-methoxy-11-(3-hydroxypropyl) dibenzo[a,d]cycloheptatriene 2-methoxy-11-hydroxy - 11 - (3 - benzyloxypropyl)dibenzo[a,d]cycloheptadiene (27 g.) is treated in an autoclave at 100° C. for 16 hours with a solution of hydrochloric acid in anhydrous ethanol (225 cc. containing 6.2 mol. of hydrochloric acid per litre of solution). After cooling and evaporation of the solvent, the residue is treated with ether (350 cc.). The organic solution obtained is washed three times with distilled water (total 900 cc.), dried over anhydrous potassium carbonate and evaporated. The sparingly volatile products are eliminated by heating at 150° C. under reduced pressure (0.1 mm. Hg) for 90 minutes. There is obtained crude 2-methoxy - 11 - (3 - hydroxypropyl)dibenzo[a,d]cycloheptatriene (21 g.).

(j) Solution of 2-methoxy-11-(3-methanesulphonyloxypropyl)dibenzo[a,d]cycloheptatriene in benzene A solution of crude 2-methoxy-11-(3-hydroxypropyl) dibenzo[a,d]cycloheptatriene (20.8 g.) in anhydrous pyridine (300 cc.) is treated at −10° C. with methanesulphonyl chloride (17 g.). The temperature is thereafter maintained for 2 hours at −10° C. and then for 1 hour 30 minutes at 0° C. The products of the reaction are poured into iced water (1 litre) and extracted three times with benzene (total 1050 cc.). The combined benzene solutions are washed with 2 N hydrochloric acid (total 1 litre) and then three times with iced water (total 1500 cc.). The residual organic solution is dried over anhydrous magnesium sulphate and evaporated under reduced pressure (20 mm. Hg) to a volume of 100 cc.

EXAMPLE 2

To a benzene solution of 2-methoxy-11-(2-methanesulphonyloxypropyl)dibenzo[a,d]cycloheptatriene (100 cc.), obtained as set out below, is added a benzene solution of dimethylamine (150 cc. containing 5.3 mol. of dimethylamine per litre of solution). The whole is heated in an autoclave at 100° C. for 21 hours. After cooling, the reaction mixture is treated with distilled water (300 cc.) and benzene (150 cc.). The decanted benzene solution is twice extracted with 2 N methanesulphonic acid (total 400 cc.). The combined acid solutions are washed with ether (200 cc.) and then made alkaline with 10 N sodium hydroxide solution (100 cc.). The oil which salts out is extracted twice with ether (total 400 cc.). The combined ethereal solutions are washed four times with distilled water (1000 cc.), dried over anhydrous potassium carbonate and evaporated. The oily residue obtained (3.4 g.) is dissolved in boiling diisopropyl ether (9.0 cc.). After cooling for 15 hours at 3° C. the crystals which have appeared are separated, washed twice with iced diisopropyl ether (total 4 cc.) and dried under reduced pressure (20 mm. Hg). There is obtained 2-methoxy-11-(2 - dimethylaminopropyl)dibenzo[a,d]cycloheptatriene (2.6 g.), M.P. 96° C.

The starting 2 - methoxy-11-(2-methanesulphonyloxypropyl)dibenzo[a,d]cycloheptatriene is prepared in the following manner:

(a) Preparation of [11-(2-methoxy)dibenzo[a,d]cycloheptatrienyl]acetic acid

A mixture of zinc powder (20 g.), anhydrous benzene (220 cc.), anhydrous toluene (220 cc.), ethyl bromacetate (33.5 g.) and 2-methoxy-11-oxodibenzo[a,d]cycloheptadiene (23.8 g.) is heated under reflux for 5 hours. After cooling, the reaction mixture is treated with ether (250 cc.) and 2 N acetic acid (250 cc.). The residual zinc is separated by filtration and washed successively with 2 N acetic acid (50 cc.) and ether (50 cc.), and the filtrate is decanted. The organic solution is washed with a saturated aqueous sodium bicarbonate solution (300 cc.) and then three times with distilled water (600 cc.), dried over anhydrous sodium sulphate and evaporated. The oily residue (32.3 g.) is treated with dioxane (350 cc.) and 2 N hydrochloric acid (250 cc.). The mixture obtained is heated under reflux for 7 hours. After cooling, the dioxane is evaporated under reduced pressure (20 mm. Hg). The residue is extracted with ether (800 cc.). The ethereal solution obtained is washed three times with distilled water (total 900 cc.) and extracted twice with 2 N sodium hydroxide solution (total 500 cc.). The combined alkaline solutions are washed with ether (200 cc.) and then acidified with concentrated hydrochloric acid (120 cc., d=1.19). The oil which salts out is extracted twice with ether (total 800 cc.). The combined ethereal solutions are dried over anhydrous magnesium sulphate and evaporated. The residue (22 g.) is dissolved in boiling ethyl acetate (110 cc.). After cooling for three hours at 3° C., the crystals which have appeared are separated, washed twice with iced ethyl acetate (total 25 cc.) and dried under reduced pressure (20 mm. Hg). There is obtained [11-(2-methoxy)dibenzo[a,d]cycloheptatrienyl] acetic acid (12 g.), M.P. 174–175° C.

(b) Preparation of 2-methoxy-11-chlorocarbonylmethyldibenzo[a,d]cycloheptatriene 2 - methoxy - 11 - chlorocarbonylmethyldibenzo[a,d] cycloheptatriene (12.0 g.), M.P.=88° C., is obtained by reacting thionyl chloride (10.2 g.) with [11-(2-methoxy) dibenzo[a,d]cycloheptatrienyl]acetic acid (12.0 g.) in benzene (110 cc.) under reflux for 2 hours.

(c) Preparation of 2-methoxy-11-(2-oxopropyl)dibenzo-[a,d]cycloheptatriene

A solution of methylmagnesium bromide in ether (prepared from 2.3 g. of magnesium turnings, 120 cc. of anhydrous ether and 18 g. of methyl bromide) is treated with anhydrous cadmium chloride (18.9 g.). After heating under reflux for 15 minutes, the ether is distilled off and replaced by anhydrous benzene. The reaction mixture, cooled to 25° C., is treated with 2-methoxy-11-chlorocarbonylmethyldibenzo[a,d]cycloheptatriene (14 g.) dissolved in anhydrous benzene (140 cc.). The product is thereafter heated under reflux for 90 minutes. After cooling, the products of the reaction are treated with N hydrochloric acid (450 cc.). The decanted aqueous phase is washed with benzene (150 cc.). The combined benzene solutions are washed twice with distilled water (total 600 cc.) and then with N sodium hydroxide solution (100 cc.) and finally twice with distilled water (500 cc.). After drying over anhydrous magnesium sulphate, the benzene is evaporated. The residue is distilled under reduced pressure, to give 2-methoxy-11-(2-oxopropyl)dibenzo[a,d] cycloheptatriene (8.4 g.), B.P. 185–190° C./0.005 mm. Hg.

(d) Preparation of 2-methoxy-11-(2-methanesulphonyloxypropyl)dibenzo[a,d]cycloheptatriene 2 - methoxy - 11 - (2 - oxopropyl)dibenzo[a,d]cycloheptatriene (8.4 g.) dissolved in methanol (140 cc.) is treated with potassium borohydride (3.3 g.) dissolved in distilled water (35 cc.). After reaction for 17 hours at 25° C., the reaction medium is diluted with distilled water (100 cc.). The methanol is evaporated under reduced pressure (20 mm. Hg). The residue is taken up in distilled water (150 cc.), 5 N sodium hydroxide solution (60 cc.) and ether (150 cc.). The aqueous solution is decanted and washed with ether (150 cc.). The combined ethereal solutions are washed twice with distilled water (total 400 cc.), dried over anhydrous potassium carbonate and evaporated, to give crude 2-methoxy-11-(2-hydroxypropyl)dibenzo[a,d]cycloheptatriene (7.4 g.) in oily form, which is thereafter dissolved in anhydrous pyridine (100 cc.) and treated at −10° C. with methanesulphonyl chloride (6.1 g.). The temperature is maintained for one hour at −10° C. and then for 2 hours at 0° C. The products of the reaction are poured into iced water (500 cc.) and extracted three times with benzene (total 600 cc.). The combined benzene solutions are washed with N hydrochloric acid (total 800 cc.) and then twice with iced distilled water (total 600 cc.). The residual organic solution is dried over anhydrous magnesium sulphate and evaporated under reduced pressure (20 mm. Hg) to a volume of 100 cc.

EXAMPLE 3

A benzene solution (150 cc.) of dimethylamine (containing 6 mol. of dimethylamine per litre of solution) is added to a benzene solution of 2-chloro-11-(3-methanesulphonyloxypropyl)dibenzo[a,d]-cycloheptatriene (150 cc.), obtained as set out below. The mixture is heated in an autoclave at 100° C. for 15 hours. After cooling, the reaction mixture is treated with distilled water (300 cc.), 10 N sodium hydroxide solution (30 cc.) and ether (500 cc.). The organic solution is washed 3 times with distilled water (total 1500 cc.) and then extracted 3 times with aqueous 2 N methanesulphonic acid solution (total 550 cc.). The combined acid solutions are washed with ether (200 cc.) and made alkaline with 10 N sodium hydroxide solution (150 cc.). The oil which salts out is extracted 3 times with ether (total 900 cc.). The combined ethereal solutions are washed 4 times with distilled water (2000 cc.), dried over anhydrous potassium carbonate and evaporated. The crystallised residue (8.7 g.) is dissolved in acetone (25 cc.) and treated with a solution of anhydrous hydrochloric acid solution in anhydrous ether (7.1 cc. containing 4.25 mol. of acid per litre of solution). After cooling for 17 hours at 3° C., the crystals which have appeared are separated, washed twice with anhydrous ether (total 45 cc.) and dried to constant weight under reduced pressure (0.1 mm. Hg) at 60° C. There is obtained 2-chloro - 11-(3 - dimethylaminopropyl)dibenzo-[a,d]cycloheptatriene hydrochloride (7.85 g.), which first melts at 190° C. and then at 210° C.

The starting 2-chloro-11 - (3 - methanesulphonyloxypropyl)dibenzo[a,d]cycloheptatriene is prepared as follows:

Preparation of crude oily 2-chloro-11-(3 - benzyloxypropyl)dibenzo[a,d]cycloheptatriene (194 g.) by the action of an ethereal solution of 3-benzyloxypropylmagnesium bromide (prepared from 21.6 g. of magnesium, 206 g. of 1-bromo-3-benzyloxypropane and 1000 cc. of anhydrous ether) on 2-chloro-11 - oxodibenzo[a,d]cycloheptadiene (145 g.).

Preparation of crude oily 2-chloro-11-(3-acetoxypropyl) dibenzo[a,d]cycloheptatriene (145 g.) by heating a mixture of 2-chloro-11-(3 - benzyloxypropyl)dibenzo[a,d]-cycloheptatriene (194 g.), acetic acid (2.3 litres), and aqueous 5 N hydrochloric acid (420 cc.) under reflux for 3 hours.

Preparation of 2-chloro-11-(3-hydroxypropyl)dibenzo [a,d]cycloheptatriene (72.5 g.) M.P.=92–94° C., by the action of sodium hydroxide in aqueous ethanolic solution under reflux on 2-chloro-11-(3 - acetoxypropyl)dibenzo [a,d]cycloheptatriene (144 g.).

Preparation of 2-chloro - 11 - (3-methanesulphonyloxypropyl)dibenzo[a,d]cycloheptatriene by the action of methanesulphonyl chloride (6.9 g.) on 2-chloro-11-(3-hydroxypropyl)dibenzo[a,d]cycloheptatriene (8.5 g.) in pyridine at −10° C. The crude product obtained is dissolved in benzene (volume of the final solution: 150 cc.).

The 2-chloro - 11 - oxodibenzo[a,d]cycloheptadiene (M.P.=104° C.) employed in this preparation may be prepared by the procedure adopted for 2-methoxy-11- oxodibenzo[a,d]cycloheptadiene as described in Example 1, starting with 2 - (4 - chlorobenzyl)benzoic acid M.P.=130° C.) and passing successively through the following products:

Methyl 2-(4-chlorobenzyl)benzoate B.P. at 0.3 mm. Hg=170–175° C.

2-(4-chlorobenzyl)benzyl alcohol, B.P. at 0.35 mm. Hg=180–184° C.

2-(4-chlorobenzyl)benzyl bromide, M.P. 58° C.

2-(4-chlorobenzyl)phenylacetonitrile, B.P. at 0.3 mm. Hg=168–170° C.

2-(4-chlorobenzyl)phenylacetic acid, M.P. 140° C., which is cyclised to 2-chloro-11-oxodibenzo[a,d]cycloheptadiene by heating with a mixture of orthophosphoric acid and phosphorus pentoxide.

EXAMPLE 4

A benzene solution of monomethylamine (240 cc. containing 2.5 mol. of methylamine per litre of solution) is added to a benzene solution of 2-chloro-11-(3-methanesulphonyloxypropyl)dibenzo[a,d]cycloheptatriene (100 cc.), obtained as in Example 3, but from 2-chloro-11-(3-hydroxypropyl)dibenzo[a,d]cycloheptatriene (5.7 g.). The operation is carried out as in Example 3 to yield 2-chloro-11 - (3 - methylaminopropyl)dibenzo[a,d]cycloheptatriene hydrochloride (5.25 g.) M.P. 196–188° C.

EXAMPLE 5

Diethylamine (9.2 g.) is added to a benzene solution of 2-chloro - 11 - (3-methanesulphonyloxypropyl)dibenzo [a,d]cycloheptatriene (100 cc.) obtained as in Example 3, but from 2-chloro - 11 - (3-hydroxypropyl)dibenzo [a,d]cycloheptatriene (7.1 g.). The operation is thereafter carried out as in Example 3 to yield 2-chloro-11-(3-diethylaminopropyl)dibenzo[a,d]cycloheptatriene hydrochloride (5.1 g.), M.P. 145° C.

EXAMPLE 6

Pyrrolidine (6.4 g.) is added to a benzene solution of 2-chloro - 11 - (3-methanesulphonyloxypropyl)dibenzo [a,d]cycloheptatriene (75 cc.) obtained as in Example 3, but from 2-chloro-11-(3 - hydroxypropyl)dibenzo[a,d] cycloheptatriene (5.1 g.). The operation is thereafter carried out as in Example 3 to yield 2-chloro-11 - (3-pyrrolidinopropyl)dibenzo[a,d]cycloheptatriene hydrochloride (4.5 g.) M.P. 210–214° C.

EXAMPLE 7

Using the procedure of Example 6, but replacing pyrrolidine by piperidine (7.65 g.), there is obtained a crude base (5.8 g.). After treating the crude product dissolved in anhydrous ethanol with anhydrous methanesulphonic acid there is obtained 2-chloro-11 - (3 - piperidinopropyl)-dibenzo[a,d]cycloheptatriene methanesulphonate (5.25 g.) M.P. 170–172° C.

EXAMPLE 8

A mixture of 2-chloro - 11-(3-chloropropyl)dibenzo [a,d]cycloheptatriene (7.55 g.), 4 hydroxypiperidine (2.52 g.), dimethylformamide (100 cc.) and sodium bicarbonate (4.2 g.) is heated under reflux for 5 hours. After cooling, the reaction mixture is treated with distilled water (1000 cc.) and extracted 3 times with ether (total 900 cc.). The combined ethereal solutions are washed with distilled water (200 cc.) and extracted twice with aqueous 2 N methanesulphonic acid (total 500 cc.). The combined acid solutions are washed with ether (150 cc.) and then made alkaline with 10 N sodium hydroxide solution (150 cc.) The oil which salts out is extracted 3 times with ether (total 750 cc.). The combined ethereal solution are washed twice with distilled water (total 1000 cc.), dried over anhydrous potassium carbonate and evaporated. The residue (7.4 g.) is converted into the hydrochloride in ethanol. After drying to constant weight under reduced pressure (0.1 mm. Hg.) at 80° C. and then hydration at ambient atmosphere, there is obtained 2-chloro - 11 - [3-(4-hydroxypiperidino)propyl]dibenzo[a,d]cycloheptatriene hydrochloride (5.2 g.) solvated with 7% of water and melting at 145° C.

By reacting thionyl chloride (42 g.) with 2-chloro-11-(3-hydroxypropyl)dibenzo[a,d]cycloheptatriene (50 g.) in chloroform, in the presence of dimethylformamide (3 g.) there is obtained 2-chloro-11 - (3 - chloropropyl)dibenzo[a,d]cycloheptatriene (49.5), M.P.=76–78° C.

EXAMPLE 9

By proceeding as in Example 8, but replacing 4-hydroxypiperidine by 1-methylpiperazine (2.5 g.), there is obtained 2-chloro - 11 - [3-(4 - methyl-1-piperazinyl)propyl]dibenzo[a,d]cycloheptatriene bis - methanesulphonate (9.8 g.), solvated with 4% of water, melting first at 198° C. and then at 215–220° C.

EXAMPLE 10

By proceeding as in Example 8, but replacing 4-hydroxypiperidine by 1-hydroxyethylpiperazine (3.25 g.), there is obtained 2-chloro-11-[3-(4-hydroxyethyl-1-piperazinyl)propyl]dibenzo[a,d]cycloheptatriene dihydrochloride (9.1 g.), M.P. 240–242° C.

EXAMPLE 11

By proceeding as in Example 8, but replacing 4-hydroxypiperidine by 1-hydroxyethoxyethylpiperazine (4.35 g.), there is obtained 2-chloro-11-[3-(4-hydroxyethoxyethyl - piperazinyl)propyl]dibenzo[a,d]cycloheptatriene dihydrochloride (8.3 g.), M.P. 230–232° C.

EXAMPLE 12

By proceeding as in Example 8, but replacing 4-hydroxypiperidine by 1-benzylpiperazine (4.4 g.), there is obtained 2 - chloro-11-[3-(4-benzyl-1-piperazinyl)propyl]dibenzo[a,d]cycloheptatriene bis-methanesulphonate (10.4 g.), M.P. 230–231° C.

EXAMPLE 13

By proceeding as in Example 8, but replacing 4-hydroxypiperidine by 1-cinnamylpiperazine (5.05 g.), there is obtained after crystallisation from acetonitrile 2-chloro-11-[3-(4-cinnamyl - 1 - piperazinyl)propy)]dibenzo[a,d]cycloheptatriene (7.6 g.), M.P. 106–107° C.

EXAMPLE 14

Dimethylamine (75 g.) dissolved in benzene (100 cc.) is added to a benzene solution of 2-bromo-11-(3-methanesulphonyloxypropyl)dibenzo[a,d]cycloheptatriene (150 cc.), obtained from 2 - bromo - 11-(3-hydroxypropyl)dibenzo[a,d]cycloheptatriene (18 g.) as described in Example 3 for the corresponding 2-chloro derivative. The operation is carried out as in Example 3, and there is obtained 2-bromo-11-(3-dimethylaminopropyl)dibenzo[a,d]cycloheptatriene maleate (21.1 g.), M.P. 155–157° C. The base melts at 74–76° C.

The starting 2 - bromo-11-(3-hydroxypropyl)dibenzo[a,d]cycloheptatriene may be prepared as follows:

Preparation of crude oily 2-bromo-11-(3-benzyloxypropyl)dibenzo[a,d]cycloheptatriene (61 g.) by the action of an ethereal solution of 3-benzyloxypropylmagnesium bromide (prepared from 6.5 g. of magnesium, 62.1 g. of 1-bromo-3-benzyloxypropane and 450 cc. of anhydrous ether) on 2 - bromo - 11-oxodibenzo[a,d]cycloheptadiene (51.7 g.).

Preparation of crude oily 2-bromo-11-(3-acetoxypropyl)dibenzo[a,d]cycloheptatriene (50 g.) by heating under reflux for 6 hours a mixture consisting of 2-bromo-11-(3-benzyloxypropyl)dibenzo[a,d]cycloheptatriene (61 g.), acetic acid (770 g.) and aqueous 5 N hydrochloric acid (170 cc.).

Preparation of 2-bromo-11-(3-hydroxypropyl)dibenzo[a,d]cycloheptatriene (42.4 g.) M.P.=96–98° C., by the action of sodium hydroxide in aqueous enthanolic solution under reflux on 2-bromo-11-(3-acetoxypropyl)dibenzo[a,d]cycloheptatriene (50 g.).

The 2-bromo-11-oxodibenzo[a,d]cycloheptadiene, M.P. 106° C., employed in this preparation may itself be prepared in the same way as 2-chloro-11-oxodibenzo[a,d] cycloheptadiene, but starting with 2-(4-bromobenzyl)benzoic acid, by way of the following series of products:

Methyl 2-(4-bromobenzyl)benzoate, M.P. 56° C.
2 - 4 - bromobenzyl)benzyl alcohol (B.P./0.2 mm. Hg= 165–167° C.)
2-(4-bromobenzyl)benzyl bromide, M.P. 72° C.
2-(4-bromobenzyl)phenylacetonitrile (B.P./0.5 mm. Hg= 175–178° C.)
2-(4-bromobenzyl)phenylacetic acid, M.P. 166° C., which is cyclised by heating in the presence of orthophosphoric acid and phosphorus pentoxide.

EXAMPLE 15

A benzene solution of dimethylamine (130 cc. containing 6.5 mol. of dimethylamine per litre of solution) is added to a benzene solution of 2 - methylthio - 11-(3 - methanesulphonyloxypropyl)dibenzo[a,d]cycloheptatriene (100 cc.) obtained from 2-methylthio-11-(3-hydroxypropyl)dibenzo[a,d]cycloheptatriene (8.4 g.) as described in Example 3 for the corresponding 2-chloro derivative. The operation is carried out as in Example 3, and there is obtained 2-methylthio-11-(3-dimethylaminopropyl)dibenzo[a,d]cycloheptatriene maleate (9.0 g.), M.P. 116° C.

The starting 2 - methylthio - 11 - (3-hydroxypropyl)dibenzo[a,d]cycloheptatriene may be prepared in the following manner:

Preparation of crude oily 2-methylthio-11-(3-benzyloxypropyl)dibenzo[a,d]cycloheptatriene (40.7 g.) by the action of an ethereal solution of 3-benzyloxypropylmagnesium bromide (prepared from 4.3 g. of magnesium, 41 g. of 1-bromo-3-benzyloxypropane and 270 cc. of anhydrous ether) on 2 - methylthio - 11-oxodibenzo[a,d]cycloheptadiene (30.4 g.).

Preparation of crude oily 2-methylthio-11-(3-acetoxypropyl)dibenzo[a,d]cycloheptatriene (38 g.) by heating under reflux for 3 hours a mixture consisting of 2-methylthio - 11 - (3 - benzyloxypropyl)dibenzo[a,d]cycloheptatriene (46 g.), acetic acid (525 g.) and aqueous 5 N hydrochloric acid (130 cc.).

Preparation of 2 - methylthio - 11-(3-hydroxypropyl)dibenzo[a,d]cycloheptatriene (21.3 g., M.P. 85–86° C.) by the action of sodium hydroxide in aqueous ethanolic solution under reflux on 2-methylthio-11-(3-acetoxypropyl) dibenzo[a,d]cycloheptatriene (24.5 g.).

The 2 - methylthio-11-oxodibenzo[a,d]cycloheptadiene, M.P. 104° C. employed in this preparation may itself be prepared by the procedure adopted for 2-chloro-11-oxodibenzo[a,d]cycloheptadiene, starting with 2-(4-methylthiobenzoyl)benzoic acid, by way of the following succession of products:

2-(4-methylthiobenzyl)benzoic acid, M.P. 129° C.
Methyl 2-(4-methylthiobenzyl)benzoate
2-(4-methylthiobenzyl)benzyl alcohol, M.P. 70° C.
2-(4-methylthiobenzyl)benzyl chloride
2-(4-methylthiobenzyl)phenylacetonitrile, M.P. 75–76° C.
2-(4-methylthiobenzyl)phenylacetic acid, M.P. 138° C. which is cyclised into 2-methylthio-11-oxodibenzo[a,d] cycloheptadiene by heating in the presence of a mixture of orthophosphoric acid and phosphorus pentoxide.

EXAMPLE 16

A benzene solution of dimethylamine (250 cc. containing 4.3 mol. of dimethylamine per litre of solution) is added to a benzene solution of 2-methanesulphonyl-11-(3 - methanesulphonyloxypropyl)dibenzo[a,d]cycloheptatriene (80 cc.), obtained from 2-methanesulphonyl-11-(3-hydroxypropyl)dibenzo[a,d]cycloheptatriene (12.2 g.) as described in Example 3 for the corresponding 2-chloro derivative. The operation is carried out as in Example 3, and there is obtained 2-methanesulphonyl-11-(3-dimethylaminopropyl)dibenzo[a,d]cycloheptatriene oxalate (6 g.), M.P. about 130° C.

The starting 2-methanesulphonyl-11-(3-hydroxypropyl) dibenzo[a,d]cycloheptatriene may be prepared as follows:

Preparation of crude oily 2-methanesulphonyl-11-(3-benzyloxypropyl)dibenzo[a,d]cycloheptatriene (33.1 g.) by the action of paranitroperbenzoic acid (32.5 g.) on 2-methylthio - 11 - (3-benzyloxypropyl)dibenzo[a,d]cycloheptatriene (30.5 g.) (prepared as in Example 15) in solution in chloroform (550 cc.).

Preparation of crude oily 2-methanesulphonyl-11-(3-acetoxypropyl)dibenzo[a,d]cycloheptatriene (16.3 g.) by heating under reflux for 3 hours a mixture of 2-methanesulphonyl - 11 - (3 - benzyloxypropyl)dibenzo[a,d]cycloheptatriene (33.1 g.), acetic acid (350 g.) and aqueous 5 N hydrochloric acid (88 cc.).

Preparation of crude oily 2-methanesulphonyl-11-(3-hydroxypropyl)dibenzo[a,d]cycloheptatriene (12.2 g.) by the action of sodium hydroxide in aqueous ethanolic solution under reflux on 2-methanesulphonyl-11-(3-acetoxypropyl)dibenzo[a,d]cycloheptatriene (16 g.).

EXAMPLE 17

2 - methylthio - 11 - (3 - dimethylaminopropyl)dibenzo [a,d]cycloheptatriene (4.8 g.) (prepared in accordance with Example 15) dissolved in acetic acid (40 g.) and sulphuric acid (0.82 cc., $d=1.83$) is treated with hydrogen peroxide (3 cc., 130 vol.). After 24 hours at ambient temperature, the reaction mixture is diluted with distilled water (300 cc.). The solution obtained is made alkaline with 10 N sodium hydroxide solution (100 cc.). The oil which salts out is extracted twice with ether (total 500 cc.).

The combined ethereal solutions are washed 3 times with distilled water (total 900 cc.), dried over anhydrous potassium carbonate and evaporated. The residue is converted into the the oxalate, yielding 2-methanesulphonyl-11 - (3 - dimethylaminopropyl)dibenzo[a,d] - cycloheptatriene oxalate (5 g.), M.P. about 130° C., which is identical to the product prepared in Example 16.

EXAMPLE 18

2 - methylthio - 11 - (3 - dimethylaminopropyl)dibenzo [a,d]cycloheptatriene (15 g.) (prepared in accordance with Example 15) dissolved in acetic acid (140 g.) and sulphuric acid (2.56 cc., $d=1.83$) are treated with hydrogen peroxide (4.63 cc., 130 vol.). The operation is thereafter carried out as in Example 17, to yield 2-methanesulphinyl - 11 - (3 - dimethylaminopropyl)dibenzo[a,d] cycloheptatriene oxalate (14.6 g.), M.P. 160° C.

The present invention includes within its scope pharmaceutical compositions containing, as active ingredient, at least one of the dibenzocycloheptatriene derivatives of Formula I, or pharmaceutically acceptable acid addition salts or quaternary ammonium salts thereof, either in the pure state or in association with a pharmacuetical carrier or coating. The invention includes especially such preparations made up for oral, parenteral or rectal administration, or topical application, e.g. as ointments or creams.

Solid compositions for oral administration include tablets, pills, powders and granules. In such solid compositions the active product is mixed with one or more inert diluents such as sucrose, lactose or starch. These compositions may also comprise, as is normal practice, additional substances other than inert diluents, e.g. lubricating agents such as magnesium stearate. Liquid compositions for oral administration include pharmaceutically acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening flavouring or perfuming agents. The compositions according to the invention, for oral administration, also include capsules of absorbable material such as gelatin containing the active substance, with or without the addition of diluents or excipients.

Preparations according to the invention for parenteral administration include sterile aqueous or non-aqueous solutions, suspensions or emulsions. Examples of non-aqueous solvents or vehicles include propylene glycol, polyethylene glycol, vegetable oils such as olive oil, and injectable organic esters such as ethyl oleate. These compositions may also contain adjuvants, especially preserving, wetting, emulsifying and dispersing agents. Sterilisation may be carried out in various ways, for example by filtration through a bacteria-retaining filter, by incorporation in the composition of sterilising agents, by irradiation or by heating. They may also be prepared in the form of solid sterile compositions which may be dissolved in sterile water or some other sterile injectable medium immediately before use.

Compositions for rectal administration may be suppositories which contain, apart from the active product, excipients such as cocoa butter or a suitable wax base.

The percentage of active ingredient in the compositions of the invention may be varied, provided that it provides a sufficient proportion to give a suitable dosage. The dosage depends on the therapeutic effect desired, on the route of administration and on the duration of treatment; in the case of oral administration, the dosages may generally be between 5 mg. and 200 mg. of active product per day for an adult.

The following examples illustrate pharmaceutical compositions according to the invention.

EXAMPLE A

Tablets having the following composition are prepared by the usual method:

|  | Mg. |
|---|---|
| 2-methoxy - 11 - (3-dimethylaminopropyl)dibenzo-[a,d]cycloheptatriene maleate | 6.9 |
| Starch | 105.1 |
| Colloidal silica | 35 |
| Magnesium stearate | 3 |

EXAMPLE B

Tablets having the following composition are prepared by the usual method:

|  | Mg. |
|---|---|
| 2 - methoxy - 11 - (2-dimethylaminopropyl)dibenzo-[a,d]cycloheptatriene | 10 |
| Starch | 105 |
| Colloidal silica | 32 |
| Magnesium stearate | 3 |

EXAMPLE C

Tablets having the following composition are prepared by the usual method:

|  | Mg. |
|---|---|
| 2-chloro-11-[3-(4 - hydroxyethoxyethyl-1-piperazinyl) - propyl]dibenzo[a,d]cycloheptatriene dihydrochloride | 5.8 |
| Starch | 106.2 |
| Colloidal silica | 35 |
| Magnesium stearate | 3 |

EXAMPLE D

Tablets having the following composition are prepared by the usual method:

|  | Mg. |
|---|---|
| 2-bromo-11-(3-dimethylaminopropyl)dibenzo[a,d]-cycloheptatriene maleate | 13.2 |
| Starch | 101.8 |
| Colloidal silica | 32 |
| Magnesium stearate | 3 |

I claim:
1. A dibenzo[a,d]cycloheptatriene of the formula:

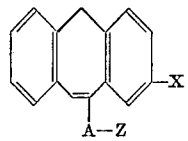

wherein:

X represents a radical selected from the class consisting of halogen, alkyl, alkoxy, alkylthio, alkanesulphinyl and alkanesulphonyl radicals;

A represents a saturated, divalent aliphatic hydrocarbon chain in which at least 2 carbon atoms separate Z from the dibenzocycloheptatriene nucleus; and Z represents a group selected from the class consisting of dialkylamino groups, and heterocyclic groups of the formula:

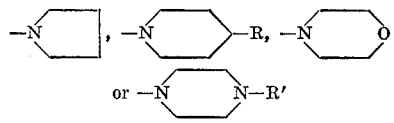

in which R represents a radical selected from the class consisting of hydrogen, hydroxyl and hydroxyalkyl radicals, and R' represents a radical selected from the class consisting of hydrogen, alkyl, hydroxyalkyl, hydroxyalkoxyalkyl, alkenyl, and alkynyl groups and phenyl, phenylalkyl and phenylalkenyl groups in which the phenyl nucleus may be substituted by at least one halogen, alkyl, alkoxy, nitro, amino, and trifluoromethyl radicals, all the aliphatic hydrocarbon chains in the X, A, Z, R and R' substituents having at most 5 carbon atoms; together with its non-toxic acid addition salts.

2. A dibenzo[a,d]cycloheptatriene according to claim 1, wherein R represents a hydrogen atom and X is other than an alkanesulphinyl group, and its non-toxic acid addition salts.

3. A dibenzo[a,d]cycloheptatriene of the formula:

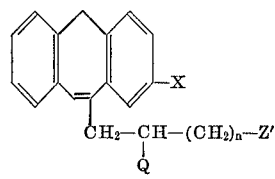

wherein Q represents a hydrogen atom and $n$ is 1, or Q represents a methyl group and $n$ is 0, X is as defined in claim 1, and Z' represents a radical selected from the class consisting of dimethylamino, 4-methyl-1-piperazinyl, 4-hydroxyethyl-1-piperazinyl, 4-hydroxyethoxyethyl-1-piperazinyl and 4-hydroxypiperidino groups; together with its non-toxic acid addition salts.

4. A dibenzo[a,d]cycloheptatriene according to claim 3, and its non-toxic acid addition salts wherein X is as defined in claim 2 and Z' is other than a 4-hydroxypiperdino group.

5. A dibenzo[a,d]cycloheptatriene according to claim 1, wherein X is methoxy, A is n-propyl and X is dimethylamino, and its non-toxic acid addition salts.

6. A dibenzo [a,d]cycloheptatriene according to claim 1, wherein X is methoxy, A is iso-propyl, and Z is dimethylamino, and its non-toxic acid addition salts.

7. A dibenzo [a,d]cycloheptatriene according to claim 1, wherein X is chlorine, A is n-propyl and Z is 4-hydroxyethoxyethyl-1-piperazinyl, and its non-toxic acid addition salts.

8. A dibenzo[a,d]cycloheptatriene according to claim 1, wherein X is bromine, A is n-propyl and Z is dimethylamino, and its non-toxic acid addition salts.

References Cited
UNITED STATES PATENTS
3,359,263   12/1967   Van der Stelt _____ 260—240

JOHN D. RANDOLPH, Primary Examiner

U.S. Cl. X.R.

260—240, 247, 247.1, 293, 293.4, 294, 326.5, 326.81, 456, 465, 469, 471, 473, 515, 516, 520, 544, 570.8, 590, 591, 609, 611, 618, 649, 651; 424—248, 250, 267, 274, 330